(12) United States Patent
Johnson et al.

(10) Patent No.: US 10,457,007 B2
(45) Date of Patent: Oct. 29, 2019

(54) MULTI-STEP BEAD FORMER

(71) Applicant: Bartell Machinery Systems, L.L.C., Rome, NY (US)

(72) Inventors: Christopher L. Johnson, Blossvale, NY (US); Paul D. Gatley, Holland Patent, NY (US)

(73) Assignee: Bartell Machinery Systems, L.L.C., Rome, NY (US)

( * ) Notice: Subject to any disclaimer, the term of this patent is extended or adjusted under 35 U.S.C. 154(b) by 469 days.

(21) Appl. No.: 15/292,935

(22) Filed: Oct. 13, 2016

(65) Prior Publication Data

US 2017/0106618 A1    Apr. 20, 2017

Related U.S. Application Data

(60) Provisional application No. 62/241,229, filed on Oct. 14, 2015.

(51) Int. Cl.
*B21F 37/00* (2006.01)
*B29D 30/48* (2006.01)
*B60C 15/04* (2006.01)

(52) U.S. Cl.
CPC .............. *B29D 30/48* (2013.01); *B21F 37/00* (2013.01); *B29D 2030/487* (2013.01); *B60C 15/04* (2013.01)

(58) Field of Classification Search
CPC ....... B21F 37/00; B29D 30/48; B29D 30/487; B60C 15/04
See application file for complete search history.

(56) References Cited

U.S. PATENT DOCUMENTS

| 1,618,131 | A | 2/1927 | Schnedarek |
| 1,981,893 | A | 11/1934 | Abbott, Jr. |
| 2,016,865 | A | 10/1935 | Lerch |
| 3,741,262 | A | 6/1973 | Bell et al. |
| 5,203,938 | A | 4/1993 | Moody et al. |
| 6,623,583 | B2 | 9/2003 | Cornet et al. |
| 7,976,661 | B2 * | 7/2011 | Sata ...................... B29D 30/48 156/136 |
| 2008/0066851 | A1 | 3/2008 | Sata |

(Continued)

FOREIGN PATENT DOCUMENTS

JP    H10-86241 A    4/1998

OTHER PUBLICATIONS

International Search Report dated Nov. 28, 2016 for International Application No. PCT/US2016/056753, 3 pages.

(Continued)

*Primary Examiner* — Pradeep C Battula
(74) *Attorney, Agent, or Firm* — Brinks Gilson & Lione

(57) ABSTRACT

An apparatus for forming a tire bead may include a rotatable bead former having a front portion and a back portion. The rotatable bead former may include a first step with a first diameter, the first step having at least a first bead-engaging surface circumnavigating an axis and configured to receive a first tire bead, and a second step located closer to the back portion than the first step, the second step having a second diameter different than the first diameter, and the second step having a second bead-engaging surface circumnavigating the axis and configured to receive a second tire bead.

17 Claims, 4 Drawing Sheets

(56) References Cited

U.S. PATENT DOCUMENTS

2015/0174841 A1  6/2015  Nishida

OTHER PUBLICATIONS

International Search Report dated Mar. 14, 2017 for International Application No. PCT/US2016/056739, 5 pages.
International Search Report and Written Opinion of the International Search Authority dated Apr. 17, 2018 in International Application No. PCT/US2016/056739 (10 pages).

* cited by examiner

MULTI-STEP BEAD FORMER

CROSS-REFERENCE TO RELATED APPLICATIONS

This application claims priority to U.S. provisional application Ser. No. 62/241,229, filed Oct. 14, 2015, which is incorporated by reference herein in its entirety.

FIELD

The current embodiments generally relate to tire bead forming equipment.

BACKGROUND

A vehicle tire generally has two annular bead rings at the innermost diameter, which provide the tire with hoop strength and structural integrity. The beads also provide stiffness at the point where the tire mounts to a rim. Beads are generally manufactured by winding metal wire in a groove on the outer periphery of a chuck or drum, often called a former. A bead may also be formed from a single wire.

Often, a single manufacturing facility may produce several types of beads with varying sizes and shapes. Existing equipment may not be able to form more than one type of bead, and therefore multiple machines, each associated with a specific type of bead, can be required in each of these facilities. Other equipment may be adjustable to accommodate different types of beads, but the adjustment process may be burdensome and require substantial modifications to the machinery. For example, the former, which is generally associated with a particular bead type, must be removed and replaced. The former is generally a heavy piece of equipment and may require a substantial amount of time to remove and replace, thereby increasing costs and production times when adjusting machinery to accommodate a different bead.

Thus, an improved bead forming system with a former having improved efficiency and ease of use may be desirable.

BRIEF SUMMARY

The present embodiments provide an apparatus for forming a tire bead. The apparatus may comprise a rotatable bead former having a front portion and a back portion. The rotatable bead former may comprise a first step with a first diameter, the first step having at least a first bead-engaging surface circumnavigating an axis and configured to receive a first tire bead, and a second step located closer to the back portion than the first step, the second step having a second diameter different than the first diameter, and the second step having a second bead-engaging surface circumnavigating the axis and configured to receive a second tire bead.

The bead former may further comprise a third step located closer to the back portion than the second step, the third step comprising a third diameter different than the second diameter and having a third bead-engaging surface circumnavigating the axis and configured to receive a third tire bead.

The second diameter may be greater than the first diameter.

The first bead-engaging surface may be segmented in at least one state.

The first step may comprise a first groove and a second groove circumnavigating the axis and configured to receive first and second tire beads.

The first groove may have a profile substantially different than the profile of the second groove.

The apparatus may comprise a first bore extending from the back portion towards the front portion to a location located beneath the first step.

The apparatus may comprise a second bore extending from the back portion towards the front portion to a location located beneath the second step, wherein the length of the second bore is less than the length of the first bore.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designated corresponding parts throughout the different views.

DETAILED DESCRIPTION

Figure 1:
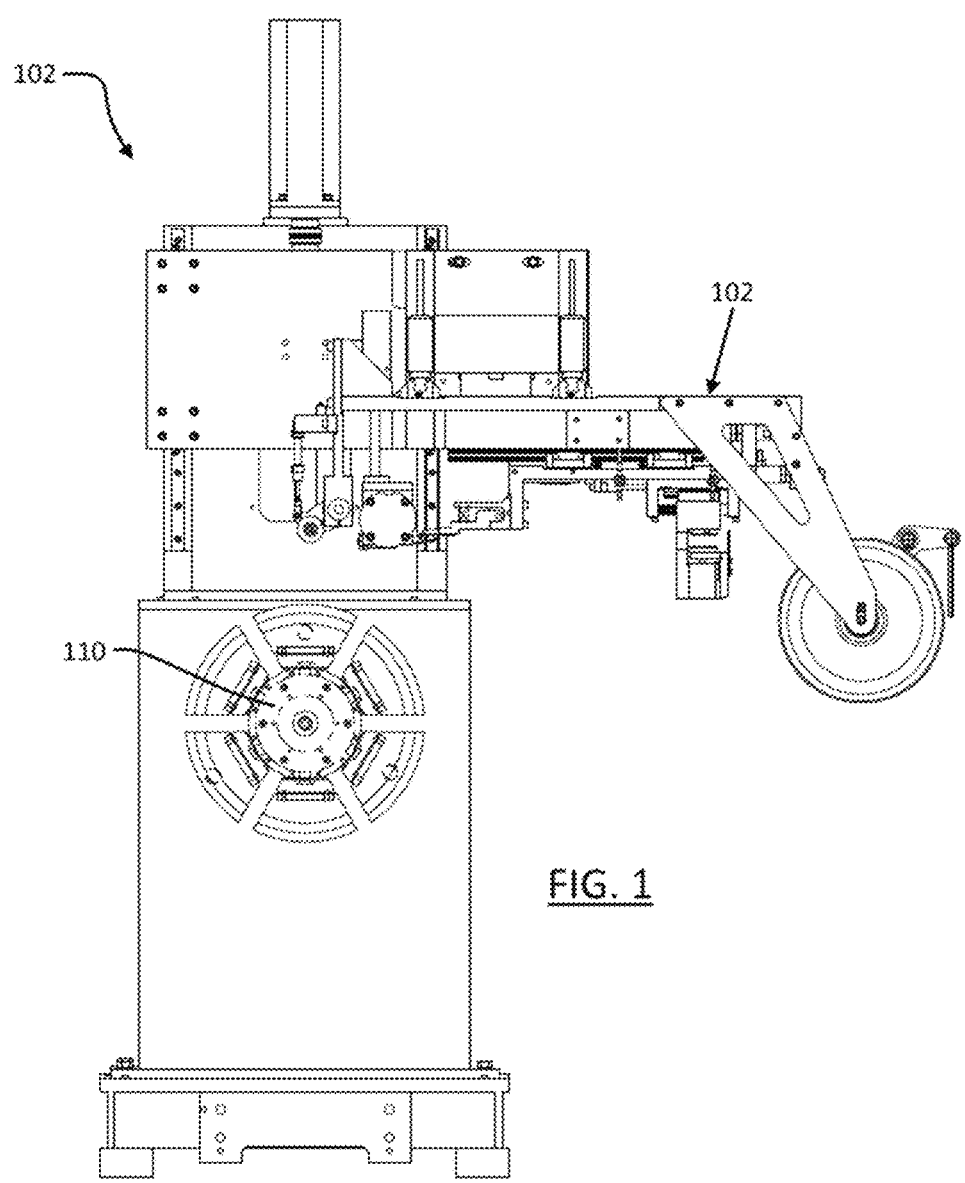
FIG. 1 shows a front view of bead forming equipment with a multi-step bead former.

One embodiment of a tire bead former is depicted by FIG. 0.1. Referring to FIG. 1, a bead forming system 102 comprises a former 110, which operates to facilitate the supporting (e.g., gripping, holding, securing) and rotating a bead (not shown) during the formation of the bead. Bead forming equipment 104 generally comprises equipment and technology for the formation of annular bead ring, and may incorporate components from commercially available products such as the SWS-6000 Single Wire Bead Winding System or the TDS-860 Bead Winder System, each of which are manufactured by Bartell Machinery Systems, L.L.C. of Rome, N.Y. Other suitable equipment for forming a tire bead may be used. The bead forming equipment 104 may form either a single-wire bead or a multi-wire (e.g., weftless) bead on the former 110.

Figure 2:
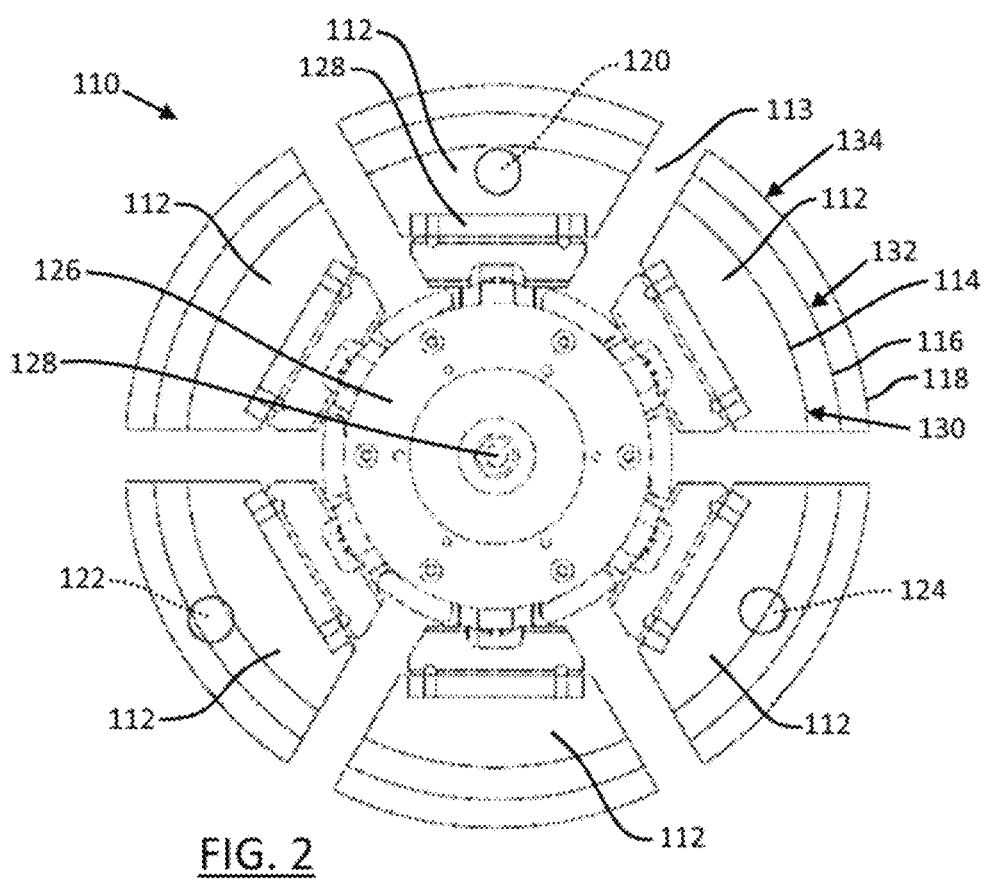
FIG. 2 shows a front view of a multi-step bead former.
Figure 3:
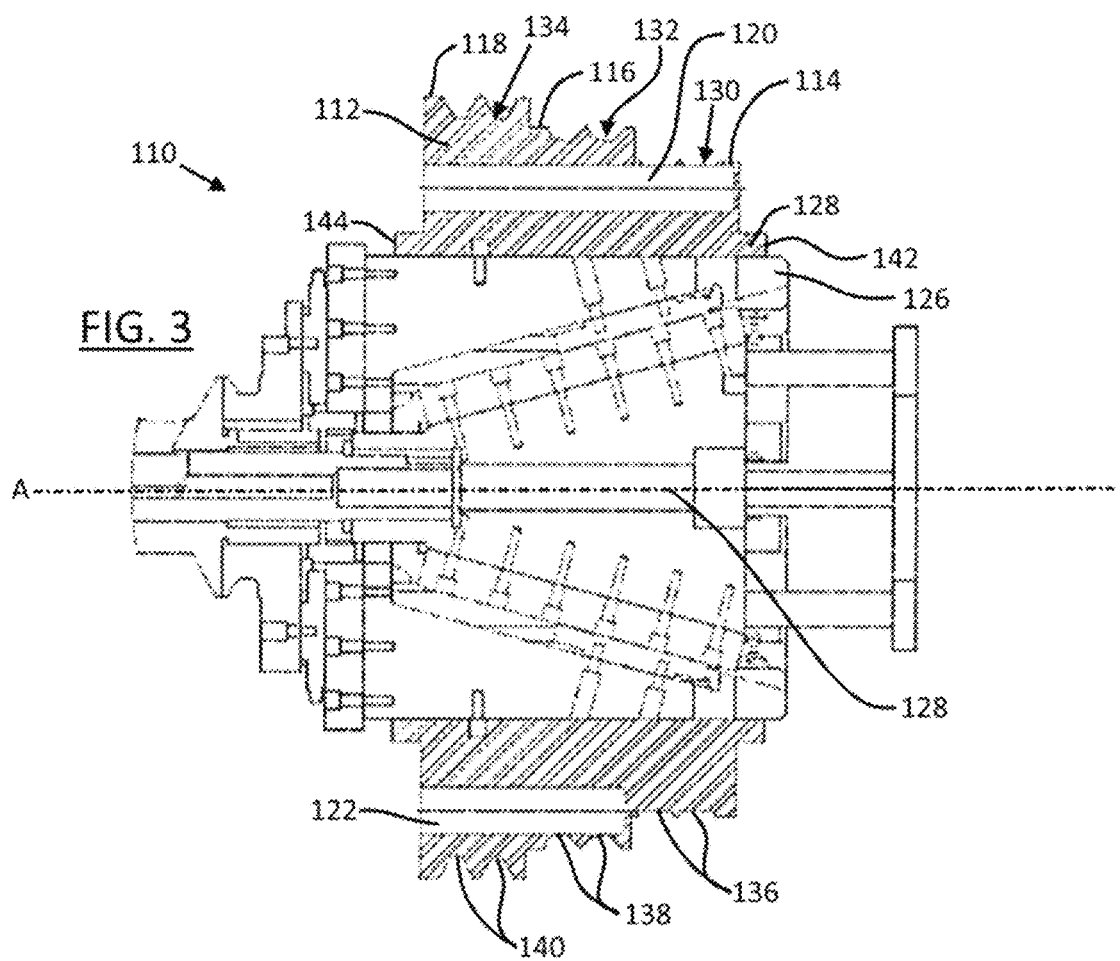
FIG. 3 shows a side cutout view of a multi-step bead former.

Referring to FIGS. 2-3, the former 110 comprises a rotatable base 126 coupled to a spindle 128. The spindle 128, which is shown as rotatable shaft, may be synchronized with the above-described bead forming equipment such that it controls the speed of rotation of the base 126 to correspond properly with the formation of a tire bead. The base 126 may be coupled to at least one shoe 112 (best shown by FIG. 2), for example, at a lower portion 128 of the shoe 112. In some embodiments, the base 126 may be coupled to a plurality of shoes 112, as depicted by FIG. 2. For illustration purposes, each shoe 112 may be described alone, and as if each of the shoes 112 is identical. However, in some embodiments, each of the plurality of shoes may be different.

The former 110 may have multiple steps, wherein each step defines a different diameter. For example, referring to the embodiment of FIG. 2-3 (and shown best by FIG. 3), the shoes 112 define a first step 114, a second step 116, and a third step 118. Each shoe 118 comprising each of the three steps 114, 116, and 118 may be a unitary body, and for example may be manufactured from a single piece of metal or other material. Alternatively, the shoe 118 may be formed of multiple pieces secured together. In this embodiment, the steps 114, 116, and 118 are associated with a first diameter, a second diameter, and a third diameter, respectively. Each step may be associated with a tire bead of a different diameter (e.g., the first step 114 is configured to facilitate the manufacturing of a tire bead with a different inner diameter than the bead corresponding to the second step 116, etc.). While depicted as having three steps 114, 116, and 118, the former 110 may alternatively comprise any other number of steps.

The first step 114 may comprise a first bead-engaging surface 130 (best shown in FIG. 3). The first bead-engaging surface 130 may circumnavigate a central axis A of the former 110 (which may be the axis of rotation). Further, the first bead-engaging surface 130 may extend around the shoes 112 on an outward-facing side of each of shoes 112 (i.e., outward-facing with respect to central axis A). The bead-engaging surface 130 may or may not be continuous. For example, there may one or more gaps 113 between one or more shoes 112, which may at least partially segment the first bead-engaging surface 130.

In some embodiments, the first bead-engaging surface 130 may be at least partially within a first groove 136. The first bead-engaging surface 130 may alternatively or additionally comprise more than one groove, depicted as the two first grooves 136, which may be configured to receive at least the inner portion of a first bead during and after formation. The first grooves 136 may be identical, and therefore may be configured to seat and/or secure identically-dimensioned beads, potentially allowing two identically-dimensioned beads to be formed simultaneously and/or without unloading the former 110. In other embodiments, each of the first grooves 136 may have differing sizes, depths, and/or profiles, which may allow for the forming of beads with differing dimensions (but possibly similar inner diameters) on the first step 114.

Similarly, the second step 116 may comprise a second bead-engaging surface 132. The second bead-engaging surface 132 may circumnavigate the central axis of the former 110, and may define a second diameter associated with a diameter of a second bead (not shown). Like the first bead-engaging surface 130, the second bead-engaging surface 132 may extend around the shoes 112 on an outward-facing side of the shoes 112, and it may be continuous or segmented. The second bead-engaging surface 132 may be configured to directly contact a second bead during and/or after formation (for example, an inner diameter of the second bead). In some embodiments, including the embodiment depicted in FIGS. 2-3, the second bead-engaging surface 132 may comprise one or more second grooves 138, which may be configured to receive at least the inner portion of the second bead during and after formation. The second grooves 138 may be identical, and therefore may be configured to seat and/or secure identically-dimensioned beads, potentially allowing two identically-dimensioned second beads to be formed simultaneously and/or without unloading the former 110. In other embodiments, each of the second grooves 138 may have differing sizes, depths, and/or profiles, which may allow for the forming of beads with differing dimension on the second step 116.

The former 110 is not limited to two steps. In some embodiments, including the embodiment depicted by FIGS. 2-3, the former 110 may include a third step 118. The third step 118 is associated with a third diameter and is depicted with a third bead-engaging surface 134, which may be configured to communicate with a third bead similar to as described above with respect to steps 114 and 116. The third bead-engaging surface 134, like described above with respect to surfaces 130 and 132, may have one or more third grooves 140, which may be configured to seat one or more third beads.

Advantageously, a former comprising multiple steps as described herein may allow a single machine to be used for the manufacturing of multiple bead types without changing tooling, which often takes a substantial amount of time and effort. This may, in turn, reduce manufacturing costs, set-up and lead times, etc., which may lead to a reduced overall cost attributed to the consumers.

Referring to FIG. 3, the shoe 112, which is depicted as a unitary body, may comprise a front portion 142 and a back portion 144. In the depicted embodiment, the first step 114 comprising the first is located closer to the front portion 142 than the second step 116 comprising the second diameter or the third step 118 comprising the third diameter, and the second step 116 is located closer to the front portion 142 than the third step 116. However, the steps are not limited to this order.

In some embodiments, the former 110 comprises at least one gripper that may communicate with at least one shoe 112. One embodiment of a gripper is described in U.S. Pat. No. 5,882,458 A to Kolb et al., which is herein incorporated by reference in its entirety The gripper may be configured to grip the bead and/or wires during bead formation for additional support during and after the formation of the bead, and may secure the bead to one of the steps 114, 116, or 118. The gripper may comprise a device that extends over one or more beads during/after formation and applies a securing force from above to ensure the one or more beads remains secured to the former 110. In other embodiments, the gripper may grip from within the former 110 (e.g., from "under" one of the grooves). Referring to FIG. 3, the former 110 may comprise one or more bores for communicating with grippers. For example, the former 110 may include bore 120 associated with a first gripper. A hole or cavity may be provided with each of the steps 114, 116, or 118 and extending radially inward such that a portion of a located underneath the steps 114, 116, or 118 at least partially within a bore (e.g., bore 120) can communicate with, and grip, the wire(s). For example, a first gripper (not shown) may be associated with the first step 114. The bore 120 may extend to a location underneath the first bead-engaging surface 130, and potentially under first grooves 136. The first gripper, which is at least partially located within the first bore 120, may communicate with (and grip), a wire or formed bead located on the first step 114 through a hole or cavity 131.

Similarly, the former 110 may comprise a second bore 122 associated with a second gripper. The second gripper (not shown) may be associated with the second step 116. As shown in FIG. 3, the bore 122 may extend to a location underneath the second surface 132, and potentially under second grooves 138. A third bore (see third bore 124 of FIG. 2) may also be included. It will be appreciated that when the bores 120, 122, and 124 extend under the respective surfaces 130, 132, and 134, each of the bores 120, 122, and 124 may have a different length. As shown in FIG. 3, the first bore 120 has a length sufficient to reach a location underneath the first bead-engaging surface 130, which will allow a first gripper to cooperate with a wire or bead located on the first step 114. The second bore 122, however, extends a distance from the back portion 144 less than the distance extended by the first bore 120 in the depicted embodiment. This embodiment is advantageous as the second bore 122 reaches a location underneath the second bead-engaging surface 132 (and sufficiently close to the second bead-engaging surface 132 to allow proper function of a second gripper), but the second bore 122 does not reach the first level 114 and therefore does not encroach the operation of the first level 114. For the same reasons, a third bore (see the third bore 124 in FIG. 2) may extend under the third level 118 but not encroach the operation of the second level 116.

Figure 4:
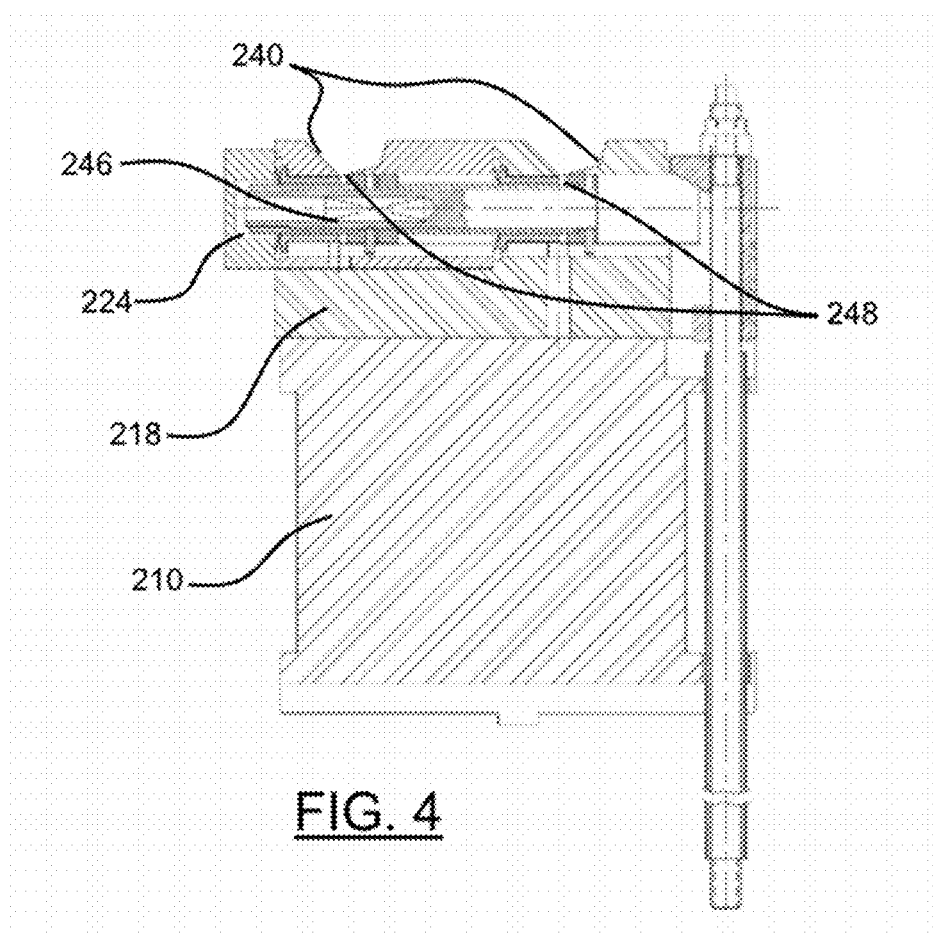
FIG. 4 shows a side cutout view of a former with an associated gripper.

For illustration, one embodiment of a former 210 associated with a gripper 246 is shown in FIG. 4. Here, the gripper 246 is located partially within a bore 224, which is associated with a third level 218 of the former 210. The gripper 246 extends to a location underneath grooves 240 of the third level 218. As shown, the grooves 218 comprise holes or cavities 248, which allow the gripper 246 to communicate with a wire or bead located in the grooves 218.

Referring back to FIG. 2, the first bore 120, second bore 122, and third bore 124 may each be located on a separate unitary shoe 112. In other embodiments there may be multiple bores associated with each step. In other embodiments, one bore may be associated with more than one step.

The former 110 may be expandable and contractible, and therefore may comprise an expanded state and a contracted state (as well as any number of intermediate states). When adjusting from an expanded state to a contracted state, the shoes 112 (referring to FIG. 2) may move towards the central axis A, thereby reducing the diameters associated with each of the steps (e.g., the first step 114, second step 116, and third step 118). The gaps 113 may decrease (or substantially disappear) during this contraction. This embodiment may be advantageous, for example, where beads are formed on the former 110 when the former 110 is in an expanded state such that they may be removed without undue effort when the former 110 changes to a contracted state. In embodiments where the former 110 can expand, the above-described bead-engaging surfaces may be continuous when the former 110 is contracted, and may be segmented (e.g., because gaps 113 are formed) when the former 110 is expanded.

Advantageously, the current embodiments allow a single former to be used to form bead of multiple diameters and profiles. This may allow different-sized beads to be formed simultaneously, or at least without changing the former tooling, which can increase manufacturing efficiency and reduce cost both to the manufacturer and final consumer. Further, utilizing shoes formed of a unitary body with multiple levels (e.g., two or more), may provide an embodiment that allows multiple grippers to associate with the former from one side of the former (e.g., all from the from in front or behind). This embodiment may also save space, reduce the number of components, reduce the weight and size of the former, and may allow a two-step, three-step, or more to be used with corresponding bead-forming equipment.

While various embodiments of the invention have been described, the invention is not to be restricted except in light of the attached claims and their equivalents. Moreover, the advantages described herein are not necessarily the only advantages of the invention and it is not necessarily expected that every embodiment of the invention will achieve all of the advantages described.

The invention claimed is:

1. An apparatus for forming a tire bead, the apparatus comprising:
a rotatable bead former having a front portion and a back portion, the rotatable bead former comprising:
a first step comprising a first diameter, the first step having at least a first bead-engaging surface circumnavigating an axis and configured to receive a first tire bead;
a second step located closer to the back portion than the first step, the second step comprising a second diameter different than the first diameter, the second step having a second bead-engaging surface circumnavigating the axis and configured to receive a second tire bead; and
a first bore extending from a back surface of the bead former in a direction towards the front portion to a location located beneath the first step, the bore being offset relative to a rotational axis of the rotatable bead former.

2. The apparatus of claim 1, wherein the bead former further comprises a third step, located closer to the back portion than the second step, the third step comprising a third diameter different than the second diameter and having a third bead-engaging surface circumnavigating the axis and configured to receive a third tire bead.

3. The apparatus of claim 1, wherein the second diameter is greater than the first diameter.

4. The apparatus of claim 1, wherein the first bead-engaging surface is segmented in at least one state.

5. The apparatus of claim 1, wherein the first step comprises a first groove and a second groove circumnavigating the axis and configured to receive first and second tire beads.

6. The apparatus of claim 5, wherein the first groove has a profile substantially different than the profile of the second groove.

7. The apparatus of claim 1, the apparatus comprising a second bore extending from a location at the back portion towards the front portion to a location located beneath the second step, wherein the length of the second bore is less than the length of the first bore.

8. A rotatable bead former, the bead former comprising:
plurality of shoes configured to rotate about an axis, wherein each of the plurality of shoes comprises:
a first level defining a first diameter of the bead former, the first level having at least a first groove for receiving a first tire bead corresponding to the first diameter, and
a second level defining a second diameter of the bead former, the second level having at least a second groove for receiving a second tire bead corresponding to the second diameter,
wherein the second diameter is greater than the first diameter,
wherein a first of the plurality of shoes communicates with a first bore extending a first distance from a back surface of the bead former to underneath the first groove, and a second of the plurality of shoes communicates with a second bore extending a second distance from the back surface of the bead former to underneath the second groove,
wherein the first distance is different than the second distance.

9. The bead former of claim 8, wherein at least one of the plurality of shoes is formed of a unitary body.

10. The bead former of claim 8, wherein each of the plurality of shoes comprises a third level defining a third diameter of the bead former, the third level having at least a third groove for receiving a third tire bead corresponding to the third diameter.

11. The bead former of claim 8, wherein each of the plurality of shoes has a front portion and a back portion, and wherein the first level is located closer to the front portion than the second level.

12. The bead former of claim 8, wherein the bead former has an expanded state and a contracted state.

13. The bead former of claim 8, wherein a first gripper is associated with the first level, and a second gripper is associated with the second level.

14. The bead former of claim 8, wherein the first groove has a profile substantially different than the second groove.

15. A method for forming a plurality of tire beads, the method comprising:
- forming a first bead on a rotatable bead former with a front portion and a back portion, the rotatable bead former having a first step with a first bead-engaging surface for receiving the first bead; and
- forming a second bead on a second bead-engaging surface for receiving the second bead;
- wherein the first bead-engaging surface is located on the first step with a first diameter, wherein the second bead-engaging surface is located on a second step with a second diameter, and wherein the first step is located closer to the back portion of the former than the second step, and
- wherein the rotatable bead former includes a first bore extending from a back surface of the bead former in a direction towards the front portion to a location located beneath the first step, the bore being offset relative to a rotational axis of the rotatable bead former.

16. The method of claim 15, wherein the bead former comprises a third step with a third bead engaging surface, the third step being adjacent to the second step.

17. The method of claim 15, wherein the first step comprises a first diameter and the second step comprises a second diameter, the first diameter being larger than the second diameter.

* * * * *